United States Patent
Cheng

[19]

[11] Patent Number: 5,960,706
[45] Date of Patent: Oct. 5, 1999

[54] MEAT STRING ROTATING DEVICE FOR BARBECUES

[76] Inventor: Wen-Ho Cheng, P.O. Box 82-144, Taipei, Taiwan

[21] Appl. No.: 09/157,252

[22] Filed: Sep. 21, 1998

[51] Int. Cl.[6] .............................. A47J 37/00; A47J 37/04
[52] U.S. Cl. ........................ 99/421 H; 99/419; 99/421 A
[58] Field of Search .......................... 99/419, 420–421 V, 99/450, 482, 494, 532, 533; 126/25 R, 9 R, 25 A, 9 A, 30; 426/523, 521

[56] References Cited

U.S. PATENT DOCUMENTS

| | | | |
|---|---|---|---|
| 3,866,527 | 2/1975 | Katris | 99/421 H |
| 4,158,991 | 6/1979 | Nakashima | 99/421 H |
| 5,007,403 | 4/1991 | Chen | 126/25 R |
| 5,058,493 | 10/1991 | Basek et al. | 99/427 X |
| 5,168,798 | 12/1992 | Kristofich et al. | 99/419 X |
| 5,172,628 | 12/1992 | Pillsbury et al. | 99/421 A |
| 5,715,744 | 2/1998 | Coutant | 99/419 X |
| 5,720,217 | 2/1998 | Pappas | 426/523 X |

*Primary Examiner*—Timothy F. Simone
*Attorney, Agent, or Firm*—A & J

[57] ABSTRACT

A meat string rotating device for a barbecue includes a main case having a recess in which are rotatably mounted two chainwheels, the main case having an upper edge formed with a plurality of notches, two side plates fixedly mounted on two ends of the main case, a rear plate fixedly mounted on another ends of the two side plates and formed with a plurality of holes, a motor drivingly connected to one of the chainwheels, a chain arranged on the chainwheels, and a plurality of sticks each provided with a rear end configured to be received in the notches and a front end configured to be fitted in the holes of the rear plate, the rear end being provided with a toothed wheel engageable with the chain, whereby the meat string on the sticks can be automatically rotated over the fire of a barbecue thereby preventing the meat string from being burned.

3 Claims, 4 Drawing Sheets

MEAT STRING ROTATING DEVICE FOR BARBECUES

BACKGROUND OF THE INVENTION

1. Field of the Invention

This invention is related to a rotating device and in particular to one designed for automatically rotating the meat string over the fire of a barbecue.

2. Description of the Prior Art

It has been found that the conventional way to roast a meat string is simply achieved by manually rotating a stick with meat string over the fire of a barbecue. However, the meat string is easily burned when not rotated in time thereby making it harmful to the health. In addition, when required to rotate a number of sticks with meat string, it will often cause the user to be in a flurry.

Therefore, it is an object of the present invention to provide a meat string stick rotating device for a barbecue which can obviate and mitigate the above-mentioned drawbacks.

SUMMARY OF THE INVENTION

This invention is related to a meat string stick rotating device for a barbecue.

According to a preferred embodiment of the present invention, a meat string rotating device for a barbecue includes a main case having a recess in which are rotatably mounted two chainwheels, the main case having an upper edge formed with a plurality of notches, two side plates fixedly mounted on two ends of the main case, a rear plate fixedly mounted on another ends of the two side plates and formed with a plurality of holes, a motor drivingly connected to one of the chainwheels, a chain arranged on the chainwheels, and a plurality of sticks each provided with a rear end configured to be received in the notches and a front end configured to be fitted in the holes of the rear plate, the rear end being provided with a toothed wheel engageable with the chain.

It is the primary object of the present invention to provid a meat string stick rotating device for a barbecue which can automatically rotate the meat string over the fire of a barbecue.

It is another object of the present invention to provide a meat string stick rotating device for a barbecue which can prevent the meat string from being burned in roasting.

It is still another object of the present invention to provide a meat string stick rotating device for a barbecue which is simple in construction and easy to assemble.

It is still another object of the present invention to provide a meat string stick rotating device for a barbecue which is easy to use and can be firmly mounted on a grill.

It is a further object of the present invention to provide a meat string stick rotating device for a barbecue which can be carried easily.

DETAILED DESCRIPTION OF THE PREFERRED EMBODIMENT

Figure 1:
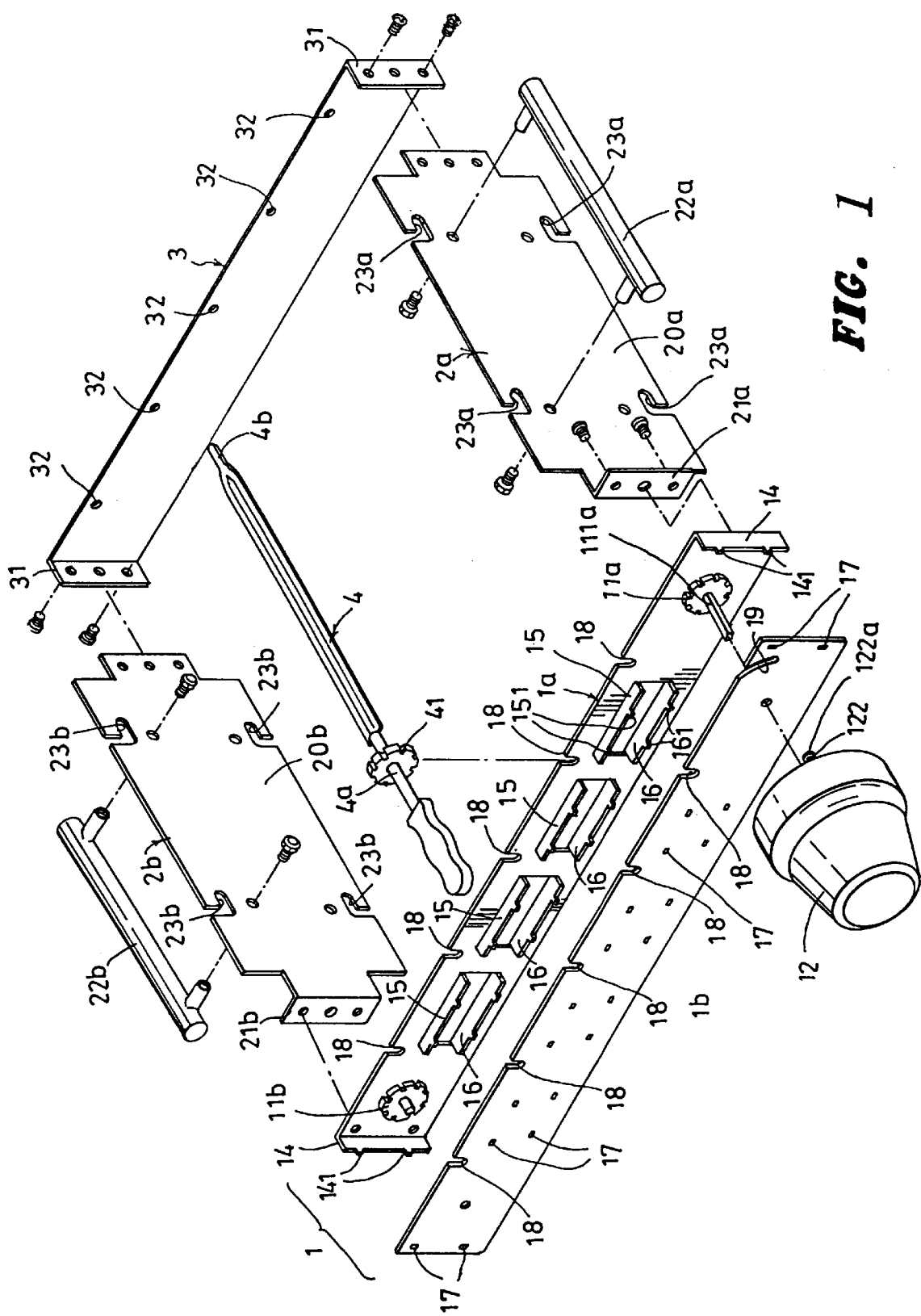
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
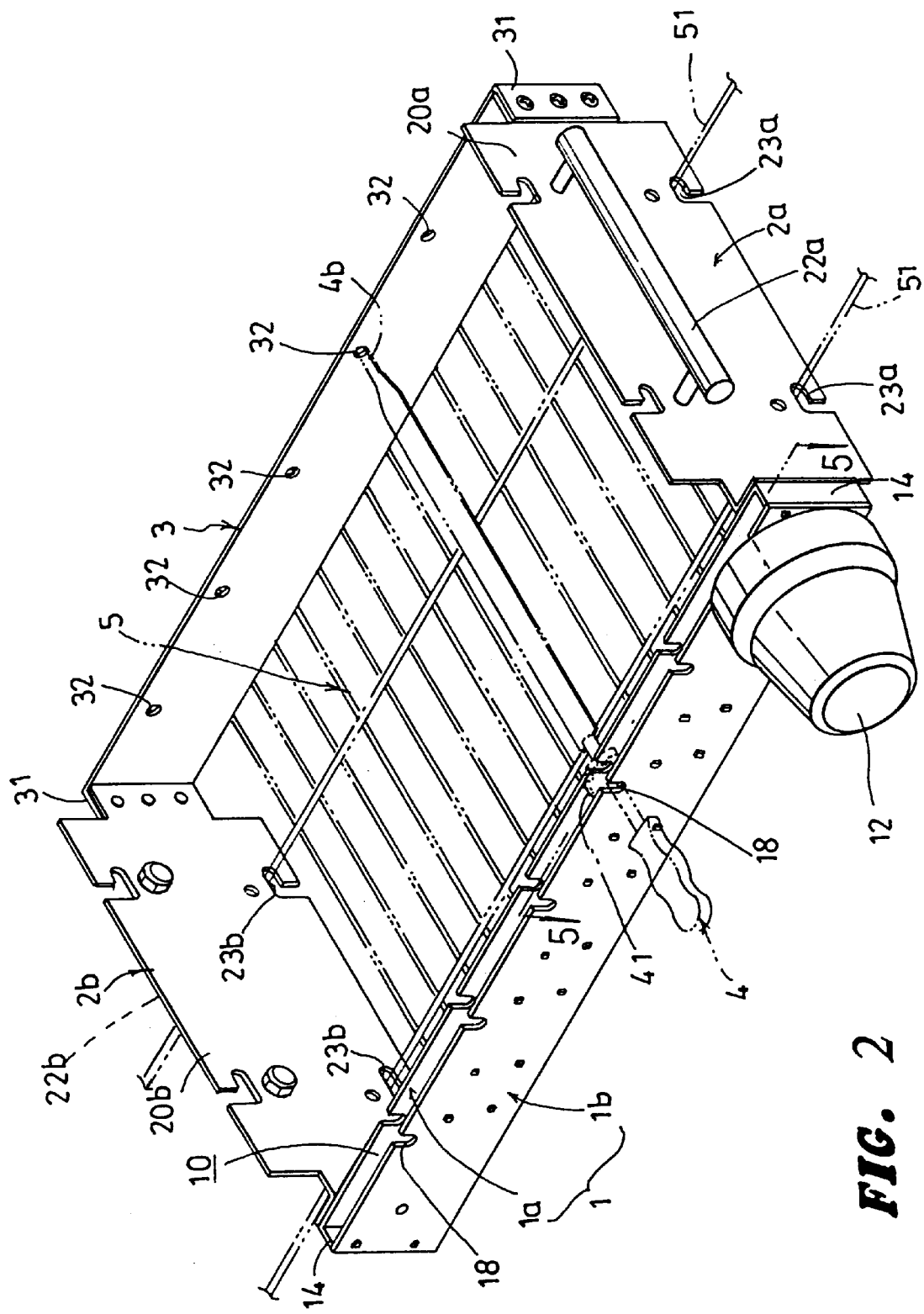
FIG. 2 is a perspective view of the present invention.
Figure 3:
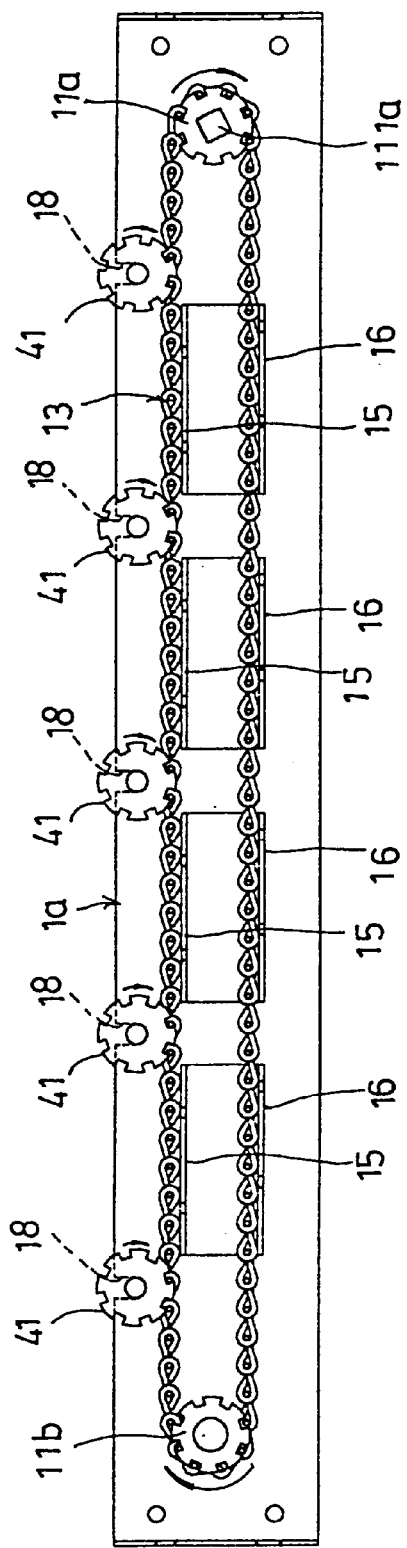
FIG. 3 illustrates the working principle of the present invention.
Figure 4:
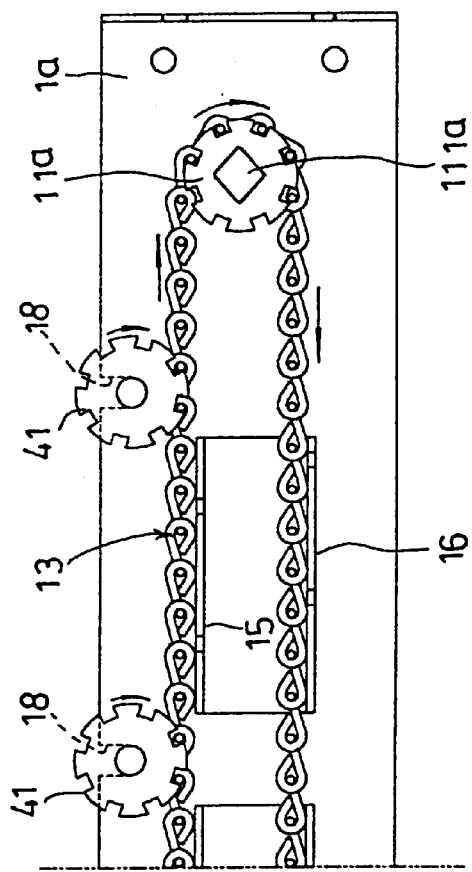
FIG. 4 illustrates an enlarged portion of FIG. 3.

With reference to the drawings and in particular to FIGS. 1, 2 and 3 thereof, the meat string rotating device for a barbecue grill according to the present invention comprises a main frame 1, two side plates 2a and 2b, a U-shaped rear plate 3, a plurality of sticks 4 (only one is shown in the drawings), a chain 13, and a motor 12.

The main frame 1 includes a U-shaped front plate 1a having two arms 14 each provided with a plurality of protuberances 141. The U-shaped front plate 1a is formed with a plurality of horizontally outwardly extending upper ribs 15 each having a plurality of protuberances 151 and a plurality of horizontally outwardly extending lower ribs 16 located under the upper ribs 15 and having a plurality of protuberances 161. The U-shaped front plate 1a is engaged with a cover 1b having a plurality of holes 17, with the protuberances 17 first extended through respective holes 17 and then bent to fixedly join the U-shaped front plate 1a and the cover 1b together thus forming a recess 10 therebetween. The upper edges of the U-shaped front plate 1a and the cover 1b are formed with a plurality of notches 18 for receiving tail ends 4a of sticks 4. Two chainwheels 11a and 11b are rotatably mounted within the recess 10 at two ends between U-shaped front plate 1a and the cover 1b. The chainwheel 11a has an axle 111a extending out of the cover 1b to engage with an output shaft 121 of a motor 12.

Figure 5:
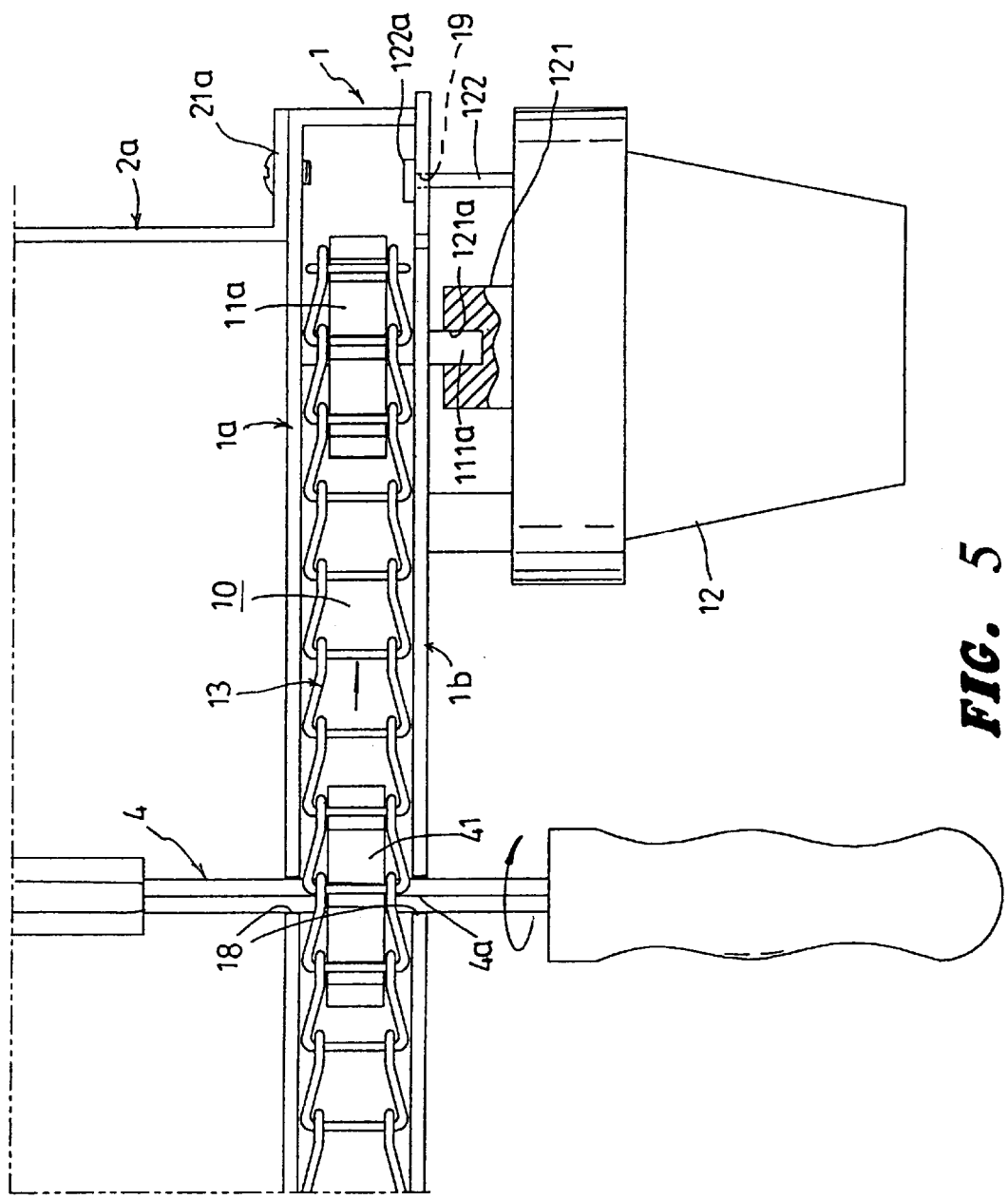
FIG. 5 is a sectional view taken along line 5—5 of FIG. 4.

As shown in FIGS. 1, 2 and 5, the output shaft 121 of the motor 12 is formed with a hole 121 (which may be polygonal in shape) configured to receive the axle 111a of the chainwheel 11a. The front end of the motor 12 is provided with a rod 122 which is parallel to the output shaft 121 and engageable with a slot 19 of the cover 1b (see FIGS. 1 and 5). The rod 122 has an enlarged head 122a for firmly keeping the motor 12 on the cover 1b. The motor 12 may be supplied with alternating or direct current.

Referrring to FIGS. 1 and 2, the two side plates 2a and 2b are formed with two lugs 21a and 21b fixedly secured to two ends of the U-shaped front plate 1a by screws. Two handles 22a and 22b are mounted on two body portions 20a and 20b of the side plates 2a and 2b for facilitating the holding the present invention. Each of the upper and lower edges of the side plate 2a is formed with two notches 23a for engaging with two metal bars 51 of a grill 5 thereby firmly keeping the present invention on the grill 5.

The rear plate 3 is a U-shaped member having two lugs 31 which are fastened on another ends of the two side plates 2a and 2b by screws. The upper portion of the rear plate 3 is formed with a plurality of holes 32 aligned with respective notches 18 of the main frame 1 for receiving the front end 4b of the stick 4.

When in use (see FIGS. 2, 3, 4 and 5), the front and rear ends 4b and 4a of the stick 4 are fitted in the hole 32 of the rear plate 3 and the notches 18 of the main frame 1, with the toothed wheel 41 arranged within the recess of the main frame 1 and meshed with the chain 13. Then, the motor 12 is switched on to rotate the chainwheel 11a which will in turn drive the chain 13 to rotate the toothed wheels 41 of the sticks 4 thereby rotating the sticks 4 and therefore enabling the meat string on the sticks 4 to be evenly roasted.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A meat string rotating device for a barbecue comprising:

a main case having a recess in which are rotatably mounted two chainwheels, said main case having an upper edge formed with a plurality of notches;

two side plates fixedly mounted on two ends of said main case;

a rear plate fixedly mounted on another ends of said two side plates and formed with a plurality of holes;

a motor drivingly connected to one of said chainwheels;

a chain arranged on said chainwheels; and a plurality of sticks each provided with a rear end configured to be received in said notches and a front end configured to be fitted in said holes of said rear plate, said rear end being provided with a toothed wheel engageable with said chain;

wherein said main case includes a U-shaped front plate and a cover, said U-shaped front plate having two arms each provided with a plurality of protuberances, said U-shaped front plate being formed with a plurality of horizontally outwardly extending upper ribs and a plurality of horizontally outwardly extending lower ribs located under the upper ribs, said cover having a plurality of holes engageable with said protuberances of said U-shaped front plate.

2. The meat string rotating device for a barbecue as claimed in claim 1, wherein said cover has an intermediate portion formed with a plurality of holes, and said upper and lower ribs are formed with a plurality of protuberances which are inserted into said holes and then bent to fixedly mount said cover on said front plate.

3. The meat string rotating device for a barbecue as claimed in claim 1, wherein said side plates are each provided with a handle, and said side plates have an upper and lower edges each formed with two notches engageable with metal bars of a grill.

\* \* \* \* \*